June 4, 1940.  E. C. WHITE  2,203,244
MIRROR SIGN
Filed June 28, 1939  4 Sheets-Sheet 1

INVENTOR
Ernest Cantelo White
BY
ATTORNEY

June 4, 1940.    E. C. WHITE    2,203,244
MIRROR SIGN
Filed June 28, 1939    4 Sheets-Sheet 2
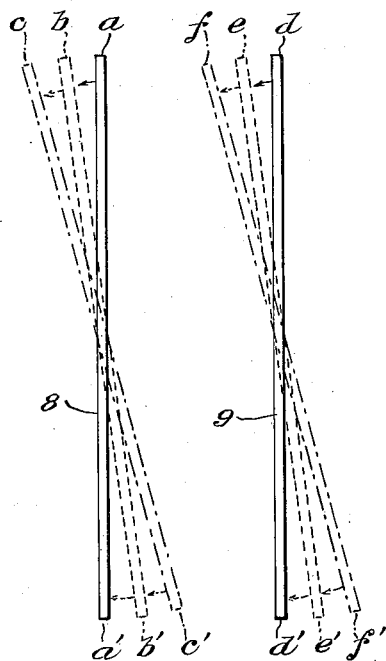
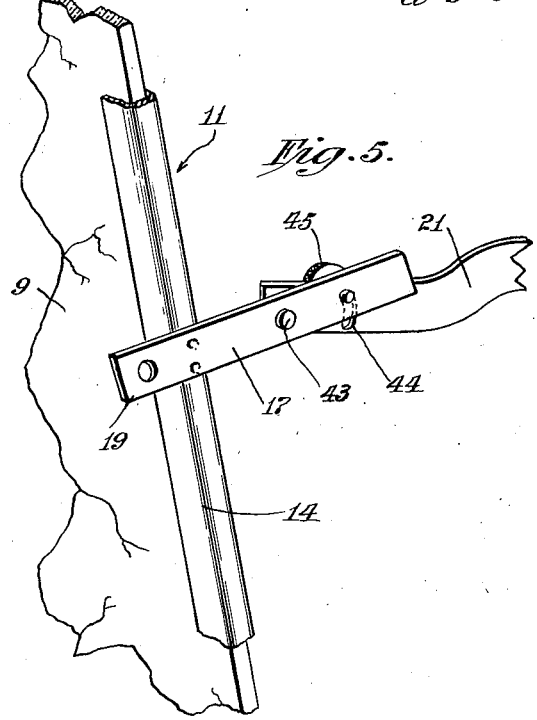
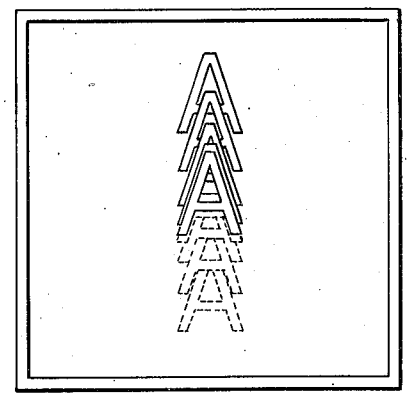
INVENTOR
*Ernest Cantelo White*
BY
ATTORNEY

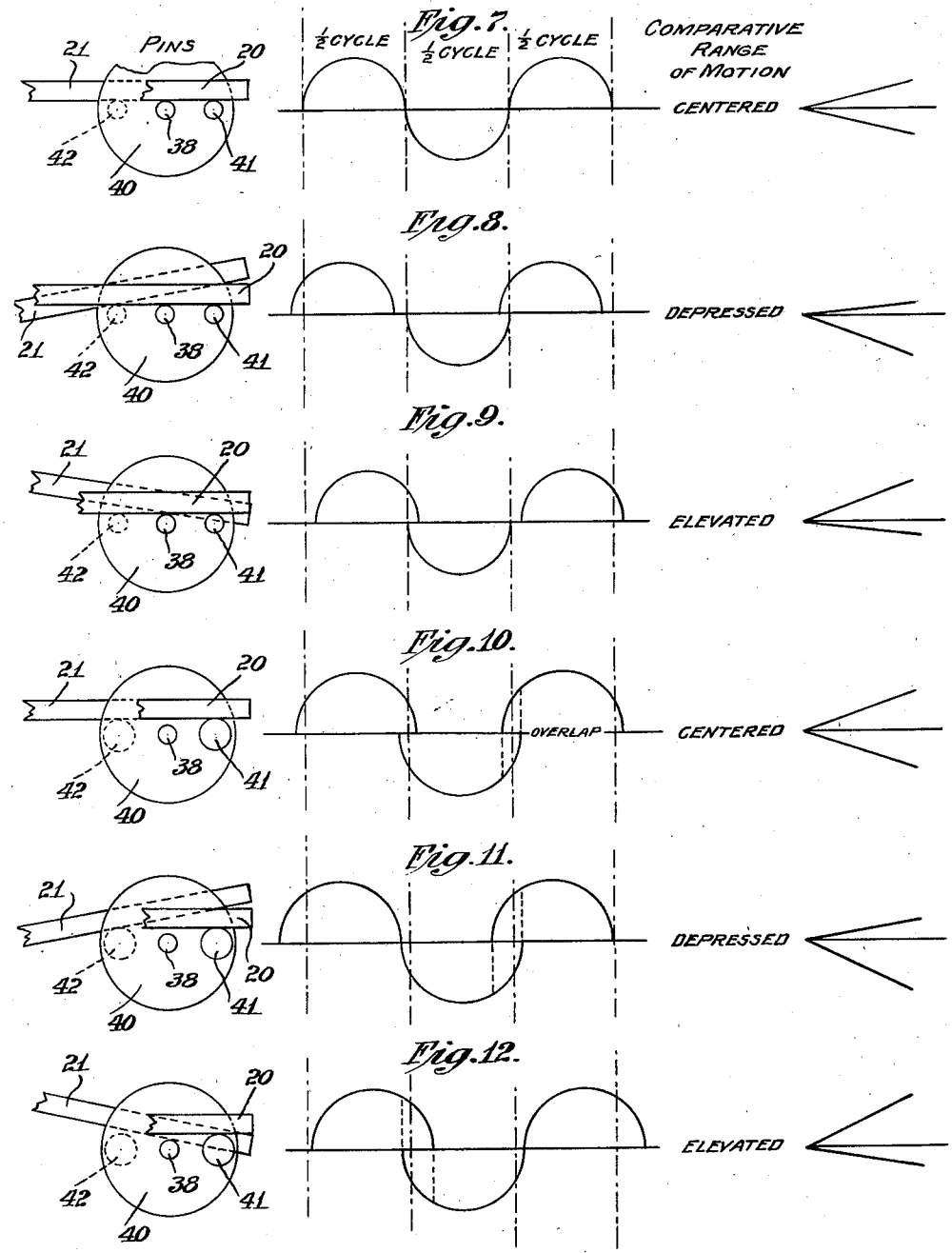

June 4, 1940.   E. C. WHITE   2,203,244
MIRROR SIGN
Filed June 28, 1939   4 Sheets-Sheet 4
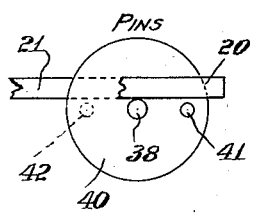
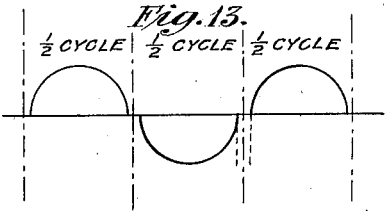
Fig. 13.
½ CYCLE | ½ CYCLE | ½ CYCLE
COMPARATIVE
RANGE
OF MOTION
CENTERED
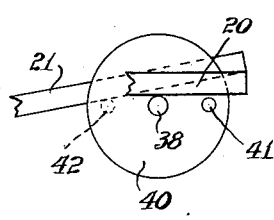
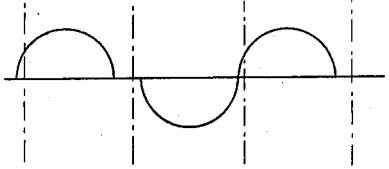
Fig. 14.
DEPRESSED
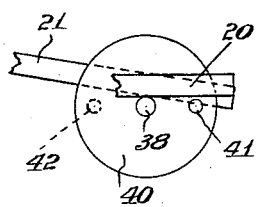
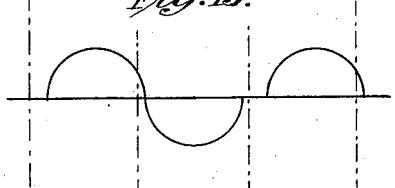
Fig. 15.
ELEVATED
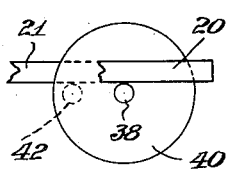
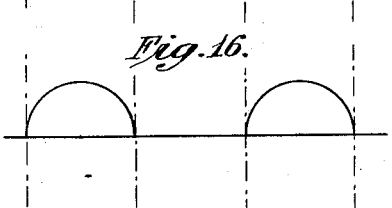
Fig. 16.
REST POSITION
CENTERED
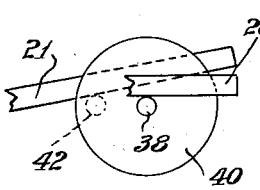
Fig. 17.
REST POSITION
DEPRESSED
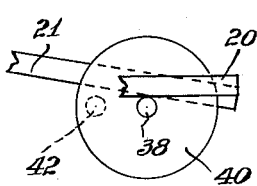
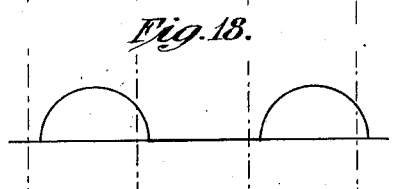
Fig. 18.
REST POSITION
ELEVATED
INVENTOR
Ernest Cantelo White
BY
ATTORNEY Patented June 4, 1940

2,203,244

UNITED STATES PATENT OFFICE 2,203,244

MIRROR SIGN

Ernest Cantelo White, Bronxville, N. Y., assignor to Multi Vue Signs Company, Incorporated, New York, N. Y., a corporation of New York Application June 28, 1939, Serial No. 281,531

20 Claims. (Cl. 40—132)

The present invention relates to improvements in a mirror sign capable of producing multiple images which appear to move, such as disclosed in United States Letters Patent 2,132,472 issued October 11, 1938, to Norman En Holm. This effect is produced by an arrangement of a front transparent mirror and a rear opaque mirror, said mirrors having opposed reflecting surfaces, and means for causing the opposed surfaces to assume varying relative angular positions by continuously moving one of said mirrors.

A sign of this type differs from the so-called third dimensional type in that the latter produces the illusion of depth by superimposing the reproduced images closely upon one another, whereas in the animated type the images are not superimposed, but are spaced a substantial distance apart because the design of the apparatus requires sufficient spacing of the mirror elements to permit relative motion therebetween; consequently image spacing is a function of mirror spacing.

The dominating feature of the En Holm type mirror sign is producing moving multiple reflections. This is accomplished primarily by continuous oscillation of one of the mirrors of the unit. I have found that by making both the transparent and the opaque mirror oscillatory, and moving them independently and alternately, some very novel effects may be obtained.

It is therefore one of the objects of the present invention to improve upon the construction of a sign of the class described by providing means for oscillating separately and alternately the several mirrors of the unit, so that variations in image animations may be obtained.

Another object is the provision of a mechanism for producing oscillations of the several mirrors in such a manner that their movement is in timed sequence, thus producing a cycle of operations respecting the varying relative positions they may assume.

Another object is the provision of a construction wherein variations of the rest and the movement periods of the mirrors comprising the set may be obtained, so that steps in the cycle of operations may be made instantly consecutive, delayed, or overlapping.

Another object of the invention is the provision of an actuating mechanism for oscillating the mirrors including a cam device and translating means coacting in such a manner that with a simple change in the design of a cam device and making an appropriate adjustment of a translating mechanism with respect to the cam device, numerous combinations of phase relationship may be obtained between the relative movement of the mirrors.

A special object of the invention is the provision of a construction wherein first one mirror is moved to a predetermined position, and then the movement thereof arrested, and concurrently therewith the other mirror set in motion for a time interval, which may be equal to the motion period of the first mirror, after which the movement of the second mirror is stopped and simultaneously therewith the movement of the first mirror is resumed. This arrangement produces the effect of continuously moving the mirrors.

A further object is the provision of adjustable means for varying the angular position of the oscillating mirror with respect to any given position of the oscillatory means for said mirror, whereby the placement of the center of oscillation in an observer's field of vision may be regulated.

Other objects, advantages and features of construction in combination of means and details will be made manifest from the following specification, it being understood that modifications, variations and adaptations may be resorted to without departing from the spirit and scope of the invention as hereinafter claimed.

The invention will be best understood by referring to the accompanying drawings showing various forms of construction embodying the features of the invention, and in which:

Fig. 5 is an enlarged perspective view of parts of the translating mechanism for oscillating the mirrors;

Fig. 6 graphically represents the different phases or steps in the cycle of operations in oscillating the mirrors;

Figs. 7 to 18 are a diagrammatic analysis of the several forms of oscillations produced by the various modifications of the cam device and adjustment of the actuating levers forming a part of the translating mechanism; and Fig. 19 is a front elevation showing the appearance of the indicia when the mirrors are pivoted on a horizontal axis.

In accordance with the present invention, a front transparent mirror and a rear opaque mirror are pivotally mounted or suspended within a casing. This suspension may embody an actuating lever for each of said mirrors, rigidly secured thereto; said levers being fulcrumed on a wall of the casing and having their free ends cooperatively positioned with respect to a cam device mounted upon the shaft of a motor. The cam device is adapted to translate, through the actuating levers, a relative motion to the mirrors so as to oscillate them sequentially, the character of the oscillations being determined by the design of the cam device.

One of the actuating levers has an adjustable arm which engages the cam device and by making suitable adjustments of said arm the character of the oscillations may be further modified; also the placement of the multiple images with respect to the axis of rotation of the mirrors may be regulated so as to come within the field of vision of an observer regardless of the position of the observer in front of the sign.

Figure 1:
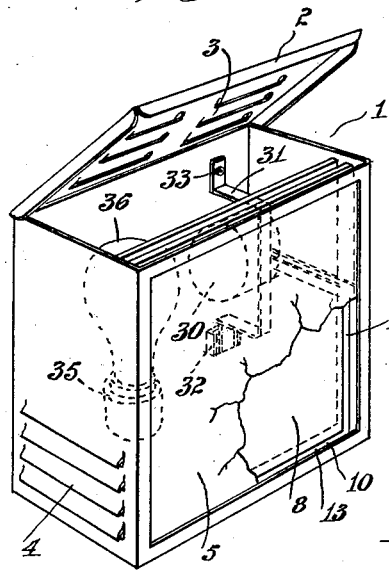
Fig. 1 is a perspective view, partly in section, of the improved mirror unit, showing the casing with the lid open.
Figure 2:
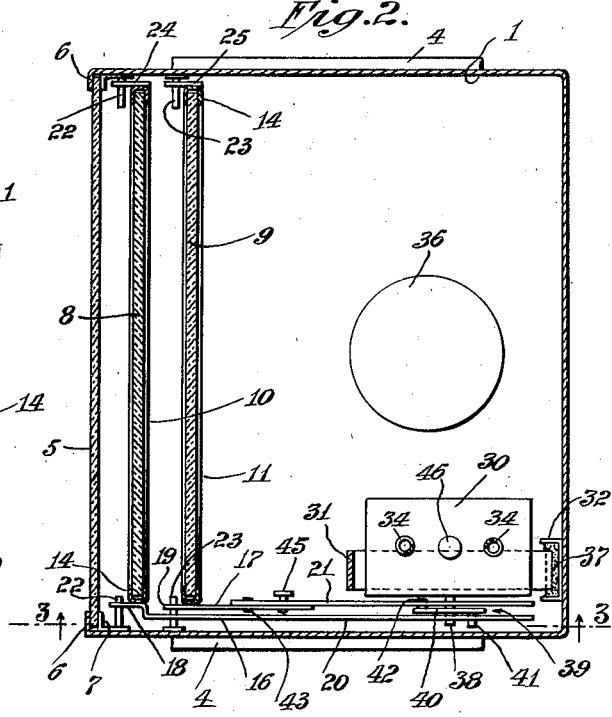
Fig. 2 is a horizontal section, taken on line 2—2 of Fig. 3.
Figure 3:
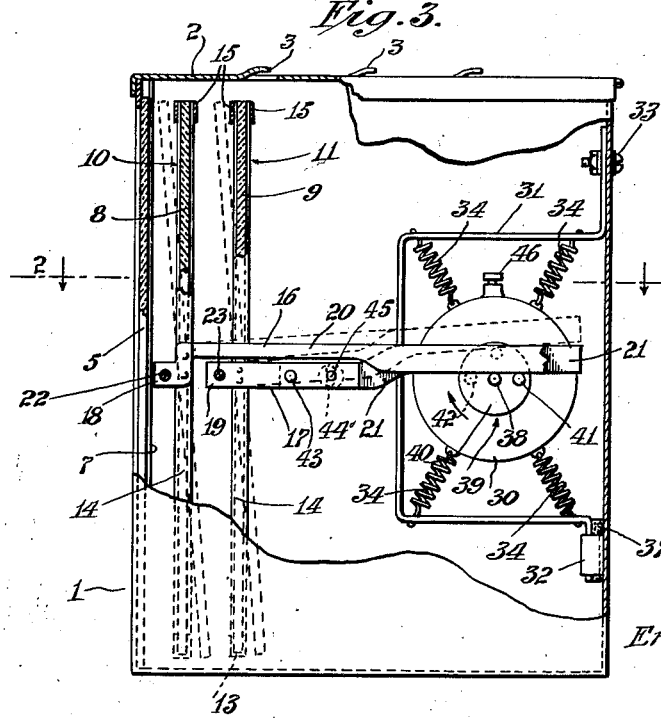
Fig. 3 is a vertical section, taken on the line 3—3 of Fig. 2.
Figure 4:
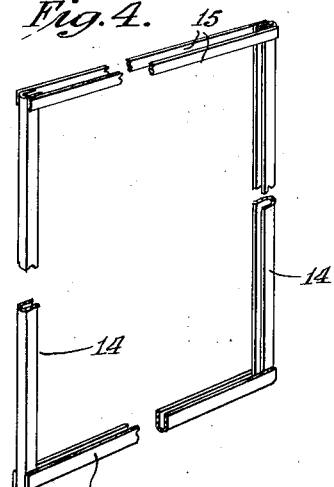
Fig. 4 is a perspective view, partly broken away, of a frame for the mirrors.

Referring to the drawings, more particularly to Figs. 1 to 3, it will be seen the present sign comprises a cabinet or casing 1, of conventional design and has a hinged lid 2 provided with louvres 3. On opposite sides of the casing 1, preferably near the bottom, are louvres 4, which in conjunction with the louvres 3, provide ventilation within the casing. The front of the casing 1 may be closed by a sheet of transparent material such as a glass plate 5, confined in a channel formed by a laterally extending flange 6, integral with the casing 1, and angle pieces 7 made of stamped sheet metal spot-welded or otherwise secured to the walls of the casing 1. The space between the flange 6 and the angle pieces 7 is slightly greater than the thickness of the glass 5, and this construction permits a convenient means for inserting or replacing the glass 5.

A front transparent mirror 8 has its rear surface provided with a thin coating of silver, which coating constitutes a reflecting surface for reflected light, but is sufficiently thin to become transparent when illuminated from the rear. Positioned in the rear of the mirror 8 is an opaque mirror 9 having its rear surface covered with a reflective coating which is non-transparent. The mirror 9 may be treated in any desired manner to produce indicia visible when illuminated. One well known method of providing the mirror 9 with indicia of this character is by the so-called "silk screen" process, which consists essentially of removing portions of the silver coating and applying a transparent or translucent color to the removed or cut-out portions. As this feature is no part of the present invention, further description thereof is deemed unnecessary.

The mirrors 8 and 9 are mounted in sheet metal frames 10 and 11 respectively, consisting of rigid U-shaped channel members forming a bottom section 13 and side walls 14, which are assembled with the lower ends of the side walls 14 inserted adjacent the ends of the bottom 13 so as to form corners therewith. The side walls 14 are closed at the top by oppositely disposed resilient strip members 15 having their ends fastened so as to provide corners for the top of the frame and an open edge for the insertion of the mirrors within the frames. This construction permits the flexure of the frames 10 and 11 in a transverse plane when the mirrors are dismantled so that the frames may be readily installed in their pivot mountings as hereinafter more fully explained.

Rigidly secured to one edge of the mirrors 8 and 9 are actuating levers 16 and 17, respectively. The levers 16 and 17 are preferably attached about centrally of the frames 10 and 11 with the short arms 18 and 19 of the levers 16 and 17 projecting slightly forward of the mirrors 8 and 9, and the long arms 20 and 21 extending rearwardly thereof. The pivot points for suspending the mirrors in the casing 1 may comprise pairs of diametrically disposed pins 22 and 23 secured to the side walls of the casing 1 in any desired manner. The short arms 18 and 19 of the levers 16 and 17 are provided with holes for engagement with one of the pins 22 and 23, thus providing pivot mountings for one side of the mirrors 8 and 9. The opposite edges of the mirror frames 10 and 11 have laterally extending arms 24 and 25 which are rigidly secured to said frames, and the arms 24 and 25 are provided with holes for the accommodation of the adjacent pins 22 and 23.

The mounting of the frames 10 and 11 within the casing 1 is a simple operation. The frames are merely bowed or flexed longitudinally, which may be done because, as explained above, of the flexible top sections comprising the strips 15, and while held in bowed position the pins 22 and 23 may be sprung into the holes provided therefor. The insertion of the mirrors 8 and 9 locks frames 10 and 11 in position, since the latter cannot be flexed with the mirrors in place. However, the mirrors may be readily removed if damaged, or to allow the substitution of mirrors bearing different indicia. By virtue of this construction the mirrors may be packaged separately, and the frames left unmounted to avoid rattling or the like during transit.

It will be noted that by this method of suspension the actuating levers 16 and 17 carry the weight of the mirrors 8 and 9, and by being rigidly secured to the frames 10 and 11, the mirrors are movable in a horizontal plane about the axis of the pins 22 and 23. It will also be noted that this construction provides gravity operation for the levers 16 and 17, in maintaining them in operative relation with a cam mechanism about to be described. It is obvious that with slight modification the mirrors 8 and 9 could be mounted to oscillate on a vertical axis.

An electric motor 30 mounted within the casing 1, is provided for oscillating the mirrors 8 and 9, which oscillation is translated through the actuating levers 16 and 17. The motor 30 may be of any suitable type, but in order to facilitate regulating the speed thereof I prefer to use a vibrating motor. A motor of that character which is now available commercially embodies an electromagnetically controlled clutch mechanism including a vibrating reed or element, the amplitude of vibration of which regulates the friction applied to the motor shaft. The amplitude of vibration of the reed may be adjusted by any suitable dampening device, such as a thumbscrew 46 mounted exteriorly of the motor frame. It is believed this structure is sufficiently well known to those skilled in the art as not to require illustration. Suffice it to say that by adjusting the thumbscrew 46 the speed of the motor 30 may be regulated to any requirement for signs of the class herein contemplated.

To sufficiently quiet a motor of this type for continuous operation I preferably provide a spring suspension comprising a bracket 31 formed of a piece of strap iron bent U-shaped and having one of its ends resting in a channel piece 32 spotwelded or otherwise secured to the casing 1 and the other end attached by a bolt 33. The motor 30 is suspended within the bracket 31 by means of coil springs 34, diagonally arranged and having one of their ends attached to the corners of the bracket 31 and the other of their ends attached to suitable eyelets carried by the frame of the motor 30. To further eliminate vibration of the motor 30 there is provided a felt pad 37 inserted under the free end of the bracket 31. The motor 30 is provided with suitable terminals (not shown) for connecting lead wires from a source of electrical energy, and for the sake of convenience, the motor circuit may include a fitting such as a socket 35 for an incandescent lamp 36 mounted in the rear of the housing 1 and behind the opaque mirror 9. As this circuit organization may be conventional, it is not illustrated in detail, but will be well understood by those skilled in the art.

Mounted on the shaft 38 of the motor 30 is a cam device designated generally by the numeral 39. The cam device 39 may comprise a disc 40, concentrically mounted and frictionally secured to the shaft 38, and having oppositely disposed pins 41, 42 extending laterally from the disc 40 and arranged so that their centers are in alignment with the center of the motor shaft 38. The lever arms 20 and 21 rest on shaft 38 on opposite sides of the disc except during the period that lever arm 20 is raised by pin 41, and lever 21 by pin 42. It may be stated at this point that the diameter of the shaft 38 and the diameter of the pins 41, 42 bear a critical relation with respect to each other, and by varying the location and the size of the pins 41, 42 the character of motion translated to the mirrors 8 and 9 may be controlled, which in turn determines the character or arrangement of the reflected images produced by the cooperative effect of the mirrors 8 and 9.

The arrangement of the shaft 38 and the pins 41, 42 as illustrated in Fig. 3 is such that they are of the same diameter and have their centers in alignment on the disc 40, although disposed on the opposite faces of said disc. The normal position of the mirrors 8 and 9 may be assumed to be when they are in parallel relation to each other with the arms 20 and 21 of the actuating levers 16 and 17 resting on the shaft 38 and the pins 41, 42 (see Figs. 2 and 3). To avoid interference of the levers 16 and 17 with each other, the lever 16 is offset with respect to the lever 17, which may be done by reducing the width of the arm 20 for a portion of its length, and off-setting the arm 21 intermediate its ends. To align the mirrors 8 and 9 so that they are parallel when arms 20 and 21 are simultaneously in engagement with the shaft 38 and the pins 41, 42, an adjustment is provided for the actuating lever 17 (see Fig. 2). This adjustment may comprise making the actuating lever 17 in two sections, with their ends overlapping a short distance, and hinged together by a pivot 43. An arcuate slot 44 is made in one of the sections for the accommodation of a thumb-screw 45 which functions as a clamp for holding the two sections of the lever 17 in an adjusted position (see Fig. 5). By regulating this adjustment the mirrors 8 and 9 may be brought into parallel alignment when both of the arms 20 and 21 of the actuating levers 16 and 17 are in engagement with the shaft 38 and the pins 41, 42.

Assuming that the motor 30 is rotated in a clock-wise direction, the arm 20 of the actuating lever 16 will remain at rest on the shaft 38 while the pin 42 moving in an upward direction carries with it the lever 17, which motion is translated to the mirror 9 and causes it to tip or oscillate on its pivotal points in such a manner that the top of the mirror 9 is inclined outwardly near the top of the casing 1, while the bottom of said mirror is moved rearwardly therefrom. As the disc 40 continues to rotate, the pin 42 eventually reaches a displacement of about 90 degrees, which represents the extreme forward movement of the mirror 9. As the pin 42 starts to descend the movement of the mirror 9 is reversed and it finally comes to rest in its normal position when the shaft 38 and pins 41, 42 are once more in alignment. Upon continued rotation of the shaft 38 the pin 41 engages the arm 20, thus transmitting the motion to the actuating lever 16 which in turn controls the oscillation of the mirror 8. The mirror 8 is now oscillated in a manner similar to that for oscillating the mirror 9, i. e., as the lever 16 is moved upwardly by the pin 41, the mirror 8 is tipped forwardly at the top and rearwardly at the bottom. This motion continues in that direction until the pin 41 has reached the height of its travel (a displacement of approximately 90 degrees from normal), and in receding from that position the rotation of the mirror 8 is now reversed until the arm 20 again comes to rest by contacting the shaft 38, at which time the oscillation of the mirror 9 will be instantly resumed and the cycle of operations repeated, effecting the constant movement of the mirrors, but in alternate periods. That is to say, one of the mirrors is at rest during the period of movement of the other, and when the first moving mirror reaches a state of rest, the second mirror is immediately placed in motion. To fully appreciate the cycle of operations it should be borne in mind that always at some stage in the oscillation of the mirrors, one of the actuating levers 16 or 17 is resting on the shaft 38, which maintains motionless the mirror controlled by the shaft then in a position at rest.

For the sake of clarity, the motions just described of the mirrors 8 and 9 are graphically illustrated in Fig. 6. Positions a and d represent the normal positions of the mirrors 8 and 9 with the actuating levers 16 and 17 in engagement with the pins 41, 42. An intermediate position of the mirrors 8 and 9 is represented by the characters b and e. As the mirrors 8 and 9 continue to oscillate they assume the extreme positions c and f, respectively. The reverse positions of the mirrors are indicated by priming these reference characters.

When the pins 41 and 42 reach the height of their respective travel and start to recede therefrom the direction of rotation of a given mirror is reversed; for example, the mirror 8 in reverse, moves from the position c' to an intermediate position b', and finally is restored to normal position a'. At this point the mirror 9 starts moving from the position d to the intermediate position e, and the extreme movement of the mirror 9 is represented by the position f. As the reverse motion f' of the mirror 9 commences, an intermediate position e' is reached, and the mirror 9 finally comes to rest in position d'. Theoretically by this arrangement at no time are both of the mirrors 8 and 9 oscillating simultaneously, but the effect of continuity of action or movement is produced by the instantaneous starting of one mirror in motion at the instant the other comes to rest. Furthermore, since clock-wise movement of the front mirror 8 produces an apparent movement of the reflected images in the same direction as a counterclock-wise movement of the rear mirror 9, and vice versa, it will be understood that an uninterrupted, continuous motion of multiple reflected images is produced by the alternate moving of the front and back mirrors 8 and 9, respectively.

This type of movement of the mirrors 8 and 9 is made possible by the fact that the shaft 38 and the pins 41, 42 are of equal diameter. Variations in this movement may be obtained by changing the diameter of either the shaft 38 or the pins 41, 42, and the character of oscillation will correspondingly be changed. Further variations may be secured by changing the angular adjustment of the sections comprising the arm 21 of the actuating lever 17. The combinations of movements thus obtained will give characteristic phase relations with respect to periods of rest and periods of movement of the mirrors 8 and 9, and by making the proper selection of size in the pins 41, 42, and the suitable adjustment of the actuating lever 17, practically any desired movement of the mirrors may be effected.

Some of the characteristic types of possible movements are illustrated in Figs. 7 to 18 and they may be designated generally as composed of three different types of oscillation, namely, instantly consecutive, delayed, or overlapping, which may be combined in any phase relation to produce practically any desired effect in the movement of the mirrors 8 and 9 which in turn impart a corresponding apparent movement of the multiple images. It will also be noted that wherever there is an overlapping in the movement of the mirrors there is produced a corresponding acceleration in the apparent movement of the images, and when there is an interruption of movement a rest period is produced. On the other hand where the movement of the mirrors is instantaneously consecutive the apparent movement of the images is continuous and at a constant speed. Bearing these facts in mind, Figs. 7 to 18 will be more easily appreciated as the description thereof proceeds.

To secure the best results in practice it may be desirable to correct what may be termed the "center of oscillation," by which is meant the center of apparent travel of the images having as their vertex the axis of rotation of the mirrors. Whether the mirrors oscillate in a vertical or horizontal plane, the movement on each side of the axis of rotation may be considered as defining the field of vision of an observer, and the position in which the sign is displayed will dictate the placement of the center of oscillation in the field of vision with respect to the observer. That is to say, the sign may be exhibited on a level with the eye, or it may be elevated above the eye or depressed below the eye. When the sign is placed on a level with the eye, the movement of the images should preferably appear equally spaced on each side of the axis of rotation. On the other hand, when the sign is viewed either above or below the eye level it is preferable to be able to change the placement of the center of oscillation in the observer's field of vision so that the observer secures the best view obtainable of the indicia from the point of observation, and as contemplated herein it is possible to locate the center of oscillation in the field of vision by providing adjustable means for varying the angular position of the oscillating mirror with respect to any given position of the means for rotating the mirror. This will be more fully appreciated as the description proceeds.

In analyzing graphically the motions or oscillations illustrated in Figs. 7 to 18 as being representative of some of the combinations that may be obtained by varying the diameter of the pins 41, 42 and the shaft 38 with respect to each other, and also by changing the adjustment of the actuating lever 17, certain general observations may be made that apply equally well in interpreting the several graphs shown. It is obvious that in each case the cycle of operations is of the same length; also the speed at which the motor shaft is rotated is the same in each instance. Further, by moving both of the mirrors, their relative movements may be represented above and below the axis of abscissas by approximately a sine wave, each half cycle period constituting the movement or state of rest of a given mirror.

It should be understood that with a change in the relative sizes of the pins 41, 42 and the shaft 38, a slight change will be effected in the total angle of oscillation of the mirrors 8 and 9. However, this is of no special significance as compared to a quite noticeable change effected in the rest periods and the acceleration in the movement of the mirrors 8 and 9 caused by making the pins 41, 42 larger or smaller than the shaft 38. For the sake of convenience, where the pins 41, 42 and shaft 38 are of the same diameter, this arrangement may be considered as the basic relation from which adjustments and/or variations may be made in obtaining the different effects illustrated graphically in Figs. 7 to 18. In those illustrations the radius of the curve, representing each half-cycle of oscillation, is taken as unity where the pins 41, 42 and the shaft 38 are equal in diameter. Where the pins are of larger diameter the radius is greater than unity, and where the pins are of smaller diameter, with respect to the shaft, the radius will be less than unity. Naturally the limits within which these radii vary will depend upon the amount of variation between the diameter of the pins and the shaft.

Referring generally to Figs. 7 to 18, parts of the translating mechanism are illustrated schematically on the left-hand side of the several figures. On the right-hand side the center of oscillation of the mirrors 8 and 9 is represented by an angle having its vertex on the axis of rotation of the mirrors and the placement of the angle with respect to the center of oscillation determines the apparent travel of the images with reference to the axis of rotation. The character of the oscillations is shown by curves which are developed by taking into consideration changes in the diameter of pins and the shaft of the cam device 39; also the adjustment of the actuating lever 17. The actuating lever 16 being non-adjustable, has no independent effect upon the modifications produced by the changes in the elements just mentioned. The legend appearing in connection with these figures is either self-explanatory or understood from the description herein.

Referring specifically to Fig. 7, the construction shown therein is that described in detail above, namely, where the pins 41, 42 and the shaft 38 are of the same diameter, and the actuating lever 17 has been so adjusted that the mirrors 8 and 9 are in parallel relation when the lever arm 21 engages the pins 42. This arrangement gives a continuous, uniform movement having substantially a pure sine wave with the center of oscillation on a level with the eye.

In Fig. 8 the pins 41, 42 and the shaft 38 are of the same diameter, but the adjustment of the actuating lever 17 is such that the arm 21 thereof when resting on the pin 42 is inclined upwardly. As the disc 40 rotates, the pin 42 is carried upwardly at an accelerated speed which produces the effect of imparting to the images an interval of fast movement in ascending, followed by a rest period in descending, which occurs because of the fact that the arm 21 comes to rest on the shaft 38 before the pin 41, coming in contact with the arm 20 of actuating lever 16, starts to move it in an upward direction. The effect in the movement of the images is that they appear to sweep rapidly upward through the center of oscillation and then at a slower rate until they reach a peak, and descend with the same swiftness until a pause is reached between the cessation of the movement of the mirror 9 and the beginning of the oscillation of the mirror 8.

The rest period is represented by a spacing or separation of that portion of the curve showing the descent of the mirror 9 and that portion of the curve representing the oscillation of the mirror 8. The acceleration of the mirror 9 is shown by the overlapping of these portions of the curve at the completion of each of the cycles. By the present arrangement the range of vision is depressed so as to lower the point of visibility of the images below the eye level of the observer.

Referring to Fig. 9, where the actuating lever 17 has been adjusted so that the arm 21 is inclined downwardly, it will be seen that when the disc 40 starts to rotate, there is an instant during which the disc is rotating without the pin engaging the arm 21. This gives the images an interval of rest in ascending, while in descending, because of the overlapping movement of the mirrors, there is produced a fast interval. The angle representing the center of oscillation is elevated with respect to the axis of rotation, which permits the location of the sign in places above the eye level of the observer and still permits complete vision of the apparent movement of the images.

It is believed from the full description of Figs. 7 to 9, a rather meager description of the remaining Figs. 10 to 18 will suffice for those skilled in the art to appreciate the modifications represented thereby. Briefly stated, in Figs. 10 to 12 inclusive the pins 41, 42 are larger than the diameter of the shaft 38. In Fig. 10, with the arm 21 horizontally adjusted to contact the pins 41, 42, the motion upwardly and downwardly is accelerated. The center of oscillation is on a level with the eye. In Fig. 11 the lever arm 21 is inclined upwardly which produces an accelerated motion on the ascent and a continuous motion on the descent, with the center of oscillation depressed. In Fig. 12, the arm 21 is inclined downwardly, which produces a continuous, uniform motion upwardly accompanied by an accelerated downward motion, and the images are elevated with respect to the center of oscillation.

In Figs. 13 to 15 inclusive the pins 41, 42 are of less diameter than the shaft 38. In Fig. 13 there is a rest period during the ascending motion followed by a rest period on the descent so that there is provided a rest interval between each half-cycle of oscillation. The center of oscillation is on a level with the observer's eye. In Fig. 14 the arm 21 is inclined upwardly, which produces a uniform, continuous ascending motion, followed by a rest period at the end of the descent. The center of oscillation is depressed with respect to the axis of rotation of the mirrors. In Fig. 15 the lever arm 21 is inclined downwardly, which gives a long rest period preceding the ascent, followed by a uniform, continuous motion in the descent. The center of oscillation is above the eye level.

In the modification shown in Figs. 16 to 18, the pin 41 has been removed, which in each instance produces a rest period extending over a complete half-cycle. In Fig. 16, with the lever arm 21 adjusted horizontally in contact with the pin 42 the ascent is a continuous, uniform motion with intermittent rest period for a full half-cycle. The center of oscillation for a half-cycle is above a level with the eye, and the effect is that the images merely move in the upper half of the field of vision. In Fig. 17 the arm 21 is inclined upwardly, which slightly shifts the oscillation in a different phase to that of Fig. 16, although otherwise the same in form, i. e., continuous in the ascent, followed by a full rest period in the descent. The center of oscillation in this instance is at the eye level. In Fig. 18, the lever arm 21 is inclined downwardly, with the consequent depression of the center of oscillation so as to be below the eye level.

Fig. 19 is an illustration of the manner in which the letter "A", representing any indicia that may be formed, for example, on the rear or opaque mirror 9, by any satisfactory method such as the "silk-screen" process, and showing the manner in which said letter will appear to the eye in multiple image form. In this illustration the center of oscillation is on a level with the eye, and the mirrors 8 and 9 are pivoted on a horizontal axis. Irrespective of the character of oscillation of the mirrors, i. e., whether consecutive, overlapping or delayed, the appearance of the multiple images will be the same, except that their apparent motion will change in accordance with the design of the translating mechanism in a given case. That is to say, the phase relation characteristic of a given cam design and the adjustment of the actuating levers with respect thereto, will influence or determine the general pattern of apparent motion of the indicia.

From the foregoing description it will be appreciated that the design of the cam member 39 determines the general character of oscillations imparted to the mirrors 8 and 9; further, that these types of oscillation may be modified so as to have different phase relations by suitable adjustment of the arm 21 of the actuating lever 17. This construction is of importance in working out certain desirable effects with different types or kinds of signs.

In some forms of advertising it is advantageous to have the multiple images produced by the mirrors appearing to move continuously and at a uniform speed. In other types of signs it may be desirable to accelerate the movement of the reflected images at certain phases or stages, this acceleration being possible by producing an overlapping effect, and the acceleration of the images produced thereby is in proportion to the extent or rate of the overlapping period.

In still other forms of signs it may be desirable to have an interval during which the images appear stationary, although the mechanism for oscillating the mirrors continues in operation, without effecting the apparent movement of the images. During such period, which may be termed "inactive" the indicia remains at rest; in that respect the sign is changed or transformed from an animated to an inanimate sign.

It is therefore obvious that to produce any desired effects it is a simple matter of varying the periods of rest and the periods of movement, which have unlimited combinations by merely selecting pins of a given diameter in respect to the shaft of the cam device, and making the proper adjustment of the actuating lever which functions as a translating means in conveying to the mirrors the particular oscillation produced by a given arrangement of the transmitting mechanism.

It will be seen from the foregoing description that because of my novel construction for oscillating the mirrors independently and in any order desired, many new and varying artistic and attractive effects can be produced in the apparent movement of the multiple reflected images formed by the indicia of the sign. Also I am not restricted to utilizing any particular method of forming and/or arranging the advertising matter on one or both of the mirrors, as it may be done in any known conventional manner. Furthermore, the mirrors need not carry any indicia, inasmuch as the images may be directly reflected from an object or projected by stereopticon.

Although my invention is characterized by a simplicity of construction, changes may be made by those skilled in the art without departing from the spirit thereof. It is my desire to cover all such changes and modifications as come within the appended claims.

In certain places in the specification and claims I have employed the term "alternately" to define the relative movement of the mirrors, and where so used the meaning intended is that they are moved separately or independently although both mirrors may be in motion at the same time during certain periods or phases in the cycle of operations. The intended meaning I give to the term is therefore to include all forms of oscillation except the continuous movement of either one or both of the mirrors, although the effect produced may be that of continuous motion of the multiple images.

What is claimed is:

1. In a sign of the class described, a mounting, an opaque rear mirror and a transparent front mirror supported on said mounting, said mirrors having opposed and spaced reflecting surfaces, one of said mirrors being provided with indicia, means for illuminating said indicia, and a translating mechanism for separately moving said mirrors in a timed cycle of operations with respect to the mounting, including means for oscillating and means for stopping one of said mirrors during predetermined portions of said cycle, and means for oscillating and means for stopping the other of said mirrors during different predetermined portions of said cycle.

2. In a sign of the class described, a mounting, an opaque rear mirror and a transparent front mirror supported on said mounting, said mirrors having opposed and spaced reflecting surfaces and being provided with indicia, means for illuminating said indicia, and a translating mechanism for moving said mirrors in a timed cycle of operations with respect to the mounting, including means for imparting movement to each mirror during respectively predetermined portions of said cycle and means for determining the position of each mirror during its respective periods of rest.

3. In a sign of the class described, a casing, an opaque rear mirror and a transparent front mirror supported in said casing, said mirrors having opposed and spaced reflecting surfaces, one of said mirrors being provided with indicia, and a translating mechanism which independently oscillates each of said mirrors comprising means for imparting motion to a given one of said mirrors, means for arresting the motion of said mirror and means for concurrently therewith imparting motion to the other of said mirrors.

4. In a sign of the class described, a casing, an opaque rear mirror and a transparent front mirror supported in said casing, said mirrors having opposed and spaced reflecting surfaces, one of said mirrors being provided with indicia, and a translating mechanism which independently oscillates each of said mirrors comprising means for periodically imparting motion to a given one of said mirrors, means for periodically arresting said motion and means for concurrently therewith imparting motion to the other of said mirrors, the said motion of each of said mirrors including a change in angular relation between the said reflecting surfaces.

5. In a sign of the class described, a casing, an opaque rear mirror and a transparent front mirror pivotally supported in said casing, said mirrors having opposed and spaced reflecting surfaces, said rear mirror being provided with a silvered rear surface formed to produce translucent indicia, means for illuminating said indicia and a translating mechanism which independently oscillates each of said mirrors comprising means for imparting motion to the reflecting surface of a given mirror through a predetermined angle, means for arresting said motion and concurrently therewith imparting a complementary motion to the reflecting surface of the other of said mirrors.

6. In a sign of the class described, a casing, an opaque rear mirror and a transparent front mirror pivotally supported in said casing, said mirrors having opposed and spaced reflecting surfaces, said rear mirror being provided with a silvered rear surface formed to produce translucent indicia, means for illuminating said indicia and a translating mechanism which independently oscillates each of said mirrors comprising means for imparting motion to the reflecting surface of a given one of said mirrors, means for arresting said motion and concurrently therewith imparting motion to the reflecting surface of the other of said mirrors, and means for creating an interval between the time of imparting motion to one of said mirrors and the time of arresting the motion of the other of said mirrors.

7. In a sign of the class described, the combination of a support, a transparent mirror and a non-transparent mirror pivotally suspended on said support, said mirrors having opposed and spaced reflecting surfaces, one of said mirrors being provided with indicia, means for illuminating said indicia, and a translating mechanism comprising a cam device having cam members, an actuating member secured to each of said mirrors and normally engaging one of said cam members, a stop member being common to both of said actuating members, and means for operating said cam device, whereby said reflecting surfaces may be oscillated by the selective operation of said actuating members.

8. In a sign of the class described, the combination of a support, a transparent mirror and a non-transparent mirror pivotally suspended on said support, said mirrors having opposed and spaced reflecting surfaces, one of said mirrors being provided with indicia, means for illuminating said indicia, and a translating mechanism comprising a cam device having cam members, an actuating lever rigidly secured to each of said mirrors, each of said levers having one end fulcrumed on said support and the other end normally engaging a given one of said cam members, a stop member common to both of said levers, and means for operating said cam device, whereby said reflecting surfaces may be oscillated by the selective operation of said levers.

9. The combination as claimed in claim 8 wherein one of the actuating levers has an adjustment for varying the relative angular position at which said adjustable actuating lever engages its associate cam member, whereby the phase relation in the oscillation of said reflecting surfaces may be modified by the adjustment of said actuating lever.

10. In a sign of the class described, the combination of a support, a transparent mirror and a non-transparent mirror pivotally suspended on said support, one of said mirrors being provided with indicia, means for illuminating said indicia, and a translating mechanism including a disc mounted upon a shaft, pins extending laterally of said disc and diametrically disposed on opposite sides thereof, the centers of said pins and shaft being in alignment, an actuating lever secured to one edge of each of said mirrors, each of said levers having one end fulcrumed on said support and the other end cyclically engaging a given one of said pins, said shaft commonly supporting said levers at one phase of their operation, and a motor for rotating said shaft, whereby said mirrors may be oscillated by the selective operation of said levers.

11. The combination as claimed in claim 10 wherein the pins are of the same diameter as the shaft and one of the actuating levers has an adjustment mechanism for aligning the mirrors in parallel relation with respect to a given operative position of said shaft, whereby the successive oscillations of said mirrors are effected without delayed or over-lapping periods.

12. The combination as claimed in claim 10 wherein the pins are of greater diameter than the diameter of said shaft, whereby the oscillations of said mirrors overlap, thus producing a change in the rate of apparent motion of the reflected images.

13. The combination as claimed in claim 10, wherein the pins are of less diameter than the diameter of said shaft, whereby the oscillation of said mirrors is interrupted for a given step in the cycle of operation thereof.

14. In a sign of the class described, the combination of a support, a transparent mirror and a non-transparent mirror mounted on said support, said mirrors having opposed and spaced reflecting surfaces and being pivotally mounted for oscillation, a display element positioned to be multireflected by said reflecting surfaces, rotary means for actuating said oscillatory mirrors in a continuous cycle, frictional means to fix the angular position of one of said oscillating mirrors with reference to any given position of said rotary means, and manually operable means to release said frictional means for adjusting said angular position and to restore said frictional means for fixing an adjusted angular position.

15. In a sign of the class described, the combination of a support, a transparent mirror and a non-transparent mirror pivotally suspended on said support, said mirrors having opposed and spaced reflecting surfaces, means for moving said mirrors alternately comprising a translating mechanism including an actuating member for each of said mirrors, one of said members having an adjustable means for periodically bringing said mirrors in parallel relation at a given point in the cycle of operations for moving said mirrors.

16. In a sign of the class described, the combination of a support, a transparent mirror and a non-transparent mirror pivotally suspended on said support, said mirrors having opposed and spaced reflecting surfaces, a display element positioned to be multireflected by said reflecting surfaces, each of said mirrors having an actuating member, means to limit the movement of both actuating members and rotary means for engaging the actuating members during different portions of each revolution of said rotary means, whereby the said mirrors are oscillated independently in a predetermined cycle of relative positions.

17. In a sign of the class described, the combination of a support, a transparent mirror and a non-transparent mirror pivotally suspended on said support, said mirrors having opposed and spaced reflecting surfaces, a display element positioned to be multireflected by said reflecting surfaces, means for moving said reflecting surfaces periodically and alternately comprising an oscillating mechanism adapted to oscillate both mirrors during a portion of each cycle of operation and to oscillate one of the mirrors while the other mirror is at rest during another portion of said cycle.

18. In a sign of the class described, the combination of a support, a transparent mirror and a non-transparent mirror pivotally suspended on said support, said mirrors having opposed and spaced reflecting surfaces, a display element positioned to be multireflected by said reflecting surfaces, each of said mirrors having an actuating member, stop means for limiting the movement of said actuating members and means for oscillating the said members, each of said actuating members being mounted to engage oscillating means and stop means at different points in a cycle of operations for moving said mirrors.

19. In a sign of the class described, the combination of a support, a transparent mirror and a non-transparent mirror pivotally suspended on said support, said mirrors having opposed and spaced reflecting surfaces, means for moving said mirrors alternately comprising a translating mechanism including an actuating member for each of said mirrors, one of said actuating members having means for fixing the relative angular positions of each of said reflecting surfaces, and cam members for oscillating each mirror in periods of movement and periods of rest, the time relation between the complete cycles of motion of the two mirrors being determined by adjustment of the parts relatively fixed by said frictional means.

20. In a sign of the class described, the combination of a support, a transparent mirror and a non-transparent mirror pivotally suspended on said support, said mirrors having opposed reflecting surfaces, one of said mirrors being provided with indicia, means for illuminating said indicia, and a translating mechanism comprising a cam device having cam members, an actuating member secured to each of said mirrors and normally engaging one of said cam members, one of said actuating members having an adjustment for varying the relative angular position at which said actuating member engages its associate cam member, whereby the phase relation in the oscillation of said mirrors may be modified by the adjustment of said actuating member.

ERNEST CANTELO WHITE.